2,833,384
SHOE MOUNTING FOR CENTRIFUGAL CLUTCH

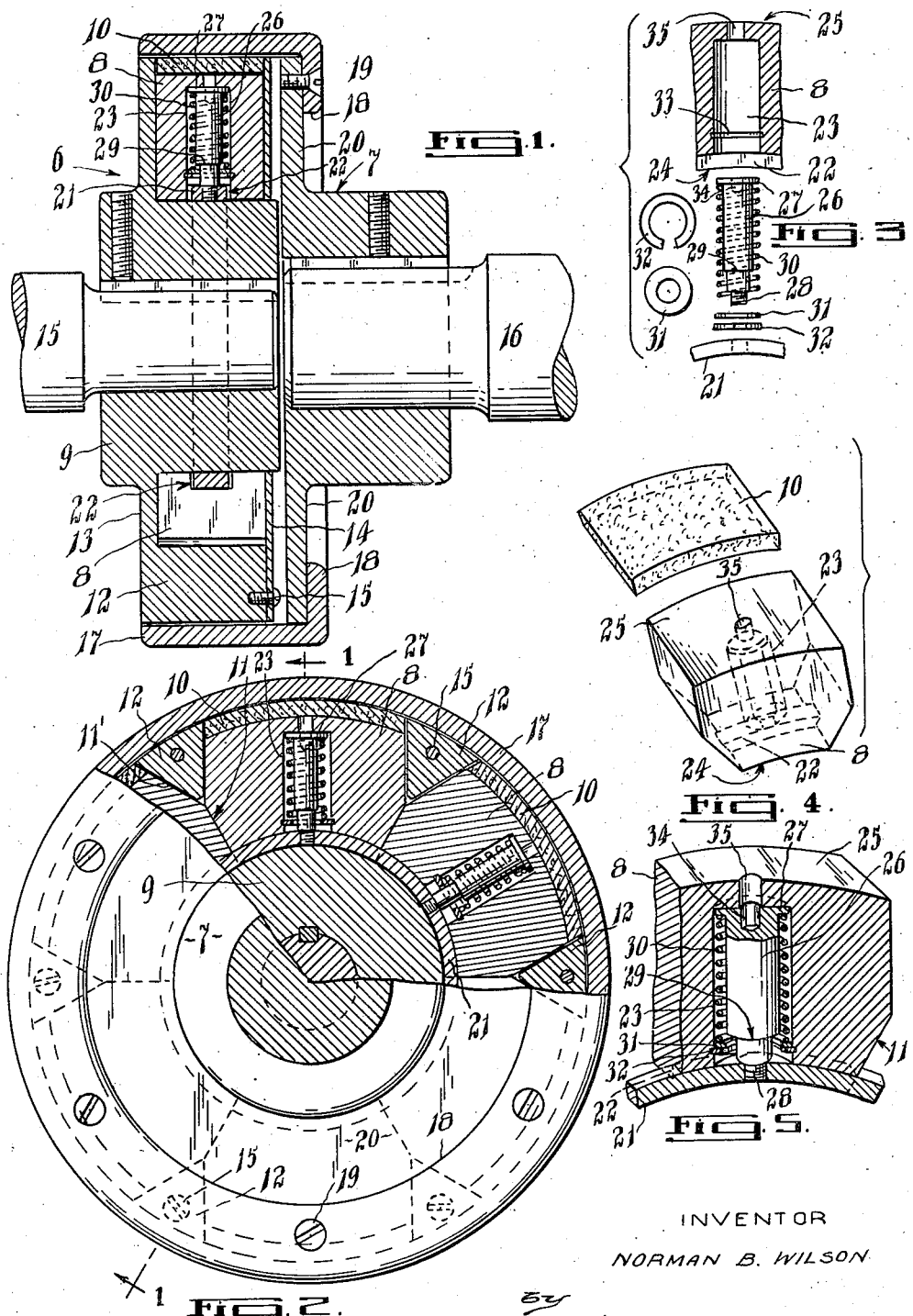

Norman B. Wilson, Toronto, Ontario, Canada

Application April 21, 1955, Serial No. 502,941

2 Claims. (Cl. 192—105)

My invention relates to improvements in centrifugal clutches of the type in which a driving connection is established between a driving member and a driven member by means of a circular arrangement of shoes which move outwardly under centrifugal force and thus bring friction faces into engagement with a drum on the driven member. In a clutch of this kind prior art arrangements constrain the shoes to radial movement by driving dogs on the driving member. In such clutch structures it is usual to employ spring devices to constrain the shoes to normal receded attitude. The spring devices include pins carried by the driving member and encircled by springs adapted to exert inward pressure on the shoes whereby a predetermined speed must be attained before the shoes are enabled to establish clutching engagement.

The object of the present invention is to provide a centrifugal clutch of this class in which improved spring means are provided to restrain the shoes against outward movement until a given speed is attained by the driving member.

A further object of the invention is to provide spring means of the kind referred to which enables one or more of the shoes to be quickly and easily removed, and also enables the shoes to be readily assembled.

A still further object is to produce a spring structure as set forth, in which studs are lodged in radial bores in the shoes and attached to a support ring on the hub of the driving member and each encircled by a compression spring of the helical type shouldered at its outer end on the stud and shouldered at its inner end against the shoe to yieldably restrain the shoe in normal position.

A still further aim is to produce a more efficient and reliable spring mounting for a shoe of a centrifugal clutch, and one which is economical to manufacture.

The invention is depicted in the accompanying drawing, in which:

Fig. 1 is an axial sectional view of the clutch showing the spring mounting structure of the present invention;

Fig. 2 is an end view of the clutch partly in section;

Fig. 3 is an exploded view of the spring mechanism for a shoe;

Fig. 4 is a perspective view of a shoe and its lining; and

Fig. 5 is a fragmentary sectional elevation of a shoe depicting the spring device mounted therein.

The known centrifugal clutch to which the present invention is applied comprises a driving member 6, a driven member 7 and a plurality of arcuate shoes 8 each forming a section of a ring. The complement of shoes encompass the hub 9 of the driving member and have loose linings 10.

Adjacent ends 11 of the shoes are cut away to provide a notch 11' of a V-shape configuration in which is disposed a driving dog 12. The dogs are of a general V-shape and are desirably integrated with the radial wall 13 of the driving member. The linings 10 are arranged individually between adjacent dogs. A retaining plate 14 is radially disposed on the driving member at the inner sides of the shoes to retain them in assembly on the driving member. The retaining plate is shown as being secured by screws 15 to the dogs 12.

The hub of the driving member is depicted as keyed on a driving shaft 15 and the driven member is shown as keyed on a driven shaft 16. In the selected form of the invention the drum 17 of the driven member is detachably constructed and to this end is flanged at a side as at 18 and this flange is secured by screws 19 to the radial wall 20 of the driven member. This detachable arrangement enables the rim to be removed for such purposes as replacing one or more of the linings without having to dismantle the clutch.

In carrying out the present invention there is procided a ring 21 sleeved on the hub 9 of the driving member to serve as a stud support. The shoes are grooved as at 22 to accommodate the ring and in each shoe there is provided a radial bore 23 which extends radially outwardly from the inner face 24 and terminates in an end wall short of the outer face 25.

A stud 26 is lodged in the radial bore 23 and has at its outer end a head 27 forming a shoulder for a spring. The inner end 28 is diametrically reduced and supplied with screw threads by which it is engaged detachably in a threaded hole in the ring 21. Near the inner extremity of the stud there is provided a reduction in the diameter which forms a stop shoulder 29.

A compression spring 30 of the helical type encircles the stud and is seated at its outer end against the head 27. The inner end is seated on a washer 31 having an inner diameter dimensioned to cause the washer to abut the stop shoulder 29. At the outer face of the washer there is provided a retaining ring 32 of the split type (detailed in Fig. 3). The retaining ring is a spring member which is sprung in an annular groove 33 supplied in the wall of the bore 23 near the mouth thereof. The spring 30 is confined under tension and thus presses the shoe to its inmost position. The head end of the stud is supplied with a socket 34 for a standard key (Allen screw type) to enable the stud to be screwed in either direction. A hole 35 is made in the shoe in alignment with the socket for rendering the socket accessible to the key (not shown).

From the preceding description it will be manifest that the invention provides a highly serviceable and efficient structure for a centrifugal clutch of the kind disclosed. In the event that a spring is required to be replaced it is only necessary to unfasten the drum 17 and to move it to one side of the clutch to expose the shoes. A shoe can be detached by unscrewing its stud and the spring can be detached by removal of the retaining ring 32.

A salient feature of the construction is that the stop shoulder 29 and the ring 32 along with the washer 31 may be advantageously employed as abutment means to limit the outward movement of a shoe to a degree necessary to preclude the metal of the shoe coming into contact with the friction face of the drum 17 in the event that the lining becomes excessively worn. This is achieved by simply positioning the ring 32 at a point along the axis of the bore 23 such as to space the outer face off the respective washer 31 from the stop shoulder 29 a distance slightly less than the thickness of the lining 10. Accordingly the shoe is prevented from moving outwardly a distance sufficient to encounter the drum.

Such changes and variations of the invention may be resorted to as fairly come within the scope of the appended claims.

What I claim is:

1. In a centrifugal clutch, a shoe assembly including a central stud support and a complement of driven shoes therearound capable of radial excursion for bringing a lining into driving engagement with a circumscribing drum of a driven member, each shoe having an inner face and an outer face and further having a radial bore of a uniform diameter leading to and communicating with said inner face, said radial bore having a diametrical reduction which provides an outer end wall adjacent to said outer face with a relatively small hole leading to said outer face, said radial bore further having an annular groove in close proximity to said inner face, a stud centrally disposed in said radial bore and having an outer end and an inner end, said stud provided at its outer end with a shoulder-forming element therearound and with a wrench-receiving socket disposed axially of said stud whereby said stud may be turned by a wrench admitted through said small hole to engage in said socket, said inner end having a diametrical reduction forming a stop shoulder and the extremity of this reduction having screw threads by which it is threadedly secured in a tapped hole provided in said stud support, a split ring sprung in said annular groove in said radial bore and having an inner diameter dimensioned less than said stud but larger than said diametrical reduction at the inner end thereof, said stop shoulder and said split ring being spaced apart a distance less than the thickness of said lining so that the shoe cannot come into contact with the drum in the event that said lining wears excessively, and a helical compression spring encircling said stud, said spring seated against said shoulder-forming element and against said split ring.

2. In a centrifiugal clutch, a shoe assembly including a central hub with a loose stud support therearound and a complement of shoes in arcuate series capable of radial excursion for bringing a lining into driving engagement with a circumscribing drum of a driven member, each shoe having an inner face and an outer face and further having a radial bore of a uniform diameter leading to and communicating with said inner face, said radial bore having a diametrical reduction which provides an outer end wall adjacent to said outer face with a relatively small hole leading to said outer face, said radial bore further having an annular groove in close proximity to said inner face, a stud centrally disposed in said radial bore and having an outer end and an inner end, said stud provided at its outer end with a shoulder-forming element therearound and with a wrench-receiving socket disposed axially of said stud whereby said stud may be turned by a wrench admitted through said small hole to engage in said socket, said inner end having a diametrical reduction forming a stop shoulder and the extremity of this reduction having screw threads by which it is threadedly secured in a tapped hole provided in said stud support, a split ring sprung in said annular groove in said radial bore and having an inner diameter dimensioned less than said stud but larger than said diametrical reduction at the inner end thereof, said stop shoulder and said split ring being spaced apart a distance less than the thickness of said lining so that the shoe cannot come into contact with the drum in the event that said lining wears excessively, and a helical compression spring encircling said stud, said spring seated against said shoulder-forming element and against said split ring.

References Cited in the file of this patent

UNITED STATES PATENTS

| | | |
|---|---|---|
| 1,851,146 | Banker | Mar. 29, 1932 |
| 2,027,970 | Gillies | Jan. 14, 1936 |

FOREIGN PATENTS

| | | |
|---|---|---|
| 828,455 | France | Feb. 14, 1938 |
| 503,046 | Belgium | May 31, 1951 |